Patented June 3, 1941

2,244,309

UNITED STATES PATENT OFFICE 2,244,309

UNSATURATED ETHERS

Clarence L. Moyle and Gerald H. Coleman, Midland, Mich., assignors to The Dow Chemical Company, Midland, Mich., a corporation of Michigan No Drawing. Application June 28, 1940,
Serial No. 343,024

7 Claims. (Cl. 260—613)

This invention is concerned with a novel group of unsaturated ethers. Our copending application Serial No. 317,316, filed February 5, 1940, discloses a class of compounds having the formula

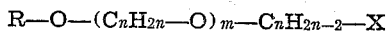

wherein R represents an aromatic radical, X represents chlorine, bromine, or hydrogen, $m$ is an integer not greater than 4, and $n$ is an integer not greater than 6. The present application is a continuation-in-part thereof and is primarily concerned with those compounds having the formula

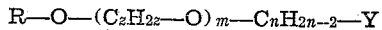

wherein R represents an aromatic radical, Y represents chlorine or bromine, $m$ is an integer not greater than 4, $n$ is an integer from 3 to 6, inclusive, $z$ is an integer from 2 to 6, inclusive, and in which the halogen of the halo-alkenyl radical is attached to an unsaturated carbon atom. These compounds are for the most part viscous water-white liquids or low-melting solids. They are relatively stable upon exposure to heat and light, somewhat soluble in most common organic solvents, and substantially insoluble in water. These ethers have been found useful as modifying agents for synthetic plastics and as insecticidal toxicants.

One method for the preparation of these new compounds consists of reacting a suitable (monohalo-alkyl) (halo-alkenyl) ether with a phenol in the presence of an alkali and water. According to this method, the reactants are mixed together and heated in a closed reactor under autogenous pressure. Temperatures ranging between about 100° and 175° C. are preferred, although somewhat higher or lower temperatures may be employed, depending upon the particular reactants concerned. When equimolecular proportions of the ether, alkali, and phenol are reacted together, the desired compound is produced in good yield. Optimum results are obtained when an excess of the (monohalo-alkyl) (halo-alkenyl) ether is employed in the reaction mixture. The concentration of the alkali present in the reaction zone is not critical, although a solution of from 5 to 30 per cent by weight is generally employed. Following completion of the reaction, the reactor and contents are cooled and the crude product washed with dilute alkali and fractionally distilled to separate out the desired ether compound.

An alternate procedure consists of reacting the alkali metal salt of an aryloxy-alkanol or aryloxy-poly-alkylene-ether-alcohol with a dihalo-alkene. This reaction is conveniently carried out by dispersing substantially equimolecular proportions of the reactants in an inert organic solvent and heating the mixture to its boiling temperature under reflux. Following completion of the reaction, the crude product is washed and fractionally distilled in the usual manner.

The term "halo-alkenyl" as herein employed refers to those unsaturated aliphatic hydrocarbon radicals containing a single double bond and a single chlorine or bromine substituent attached to an unsaturated carbon atom.

The following examples describe certain of our new ether compounds and their preparation, but are not to be construed as limiting the invention.

Example 1

A mixture of 29 grams (0.135 mol) of beta-(2-xenoxy)-ethanol, 3.1 grams (0.135 mol) of sodium metal, and 125 milliliters of dry benzene was heated to its boiling temperature and under reflux for a period of 3.5 hours to obtain the sodium salt of beta-(2-xenoxy)-ethanol. This mixture was cooled to 60° C. and 16.4 grams (0.148 mol) of 2-chloro-allyl chloride added thereto with stirring. Heating was then continued and the mixture boiled under reflux for an additional 8 hours. The resulting solution of crude product was cooled, acidified with $H_2SO_4$, washed with water to remove sodium chloride, and fractionally distilled, whereby there was obtained (beta-2-xenoxy-ethyl) (2-chloro-allyl) ether as a mobile liquid boiling at 190°–192° C. at 5 millimeters pressure and having a specific gravity of 1.15 at 25°/20° C.

Example 2

In a similar manner 95 grams (0.55 mol) of beta-(4-chloro-phenoxy)-ethanol and 14 grams (0.6 mol) of sodium metal were reacted together in 100 milliliters of toluene to form the alcoholate. 72 grams (0.65 mol) of 2-chloro-allyl chloride was then added and the mixture heated to its boiling temperature and under reflux for 2 hours. The crude reaction product was washed and fractionally distilled, whereby there was obtained 59.5 grams of (beta-4-chloro-phenoxyethyl) (2-chloro-allyl) ether as a colorless liquid boiling at 118°–120° C. at 1 millimeter pressure and having a specific gravity of 1.202 at 25°/25° C.

Example 3

76 grams (0.5 mol) of beta (2-toloxy)-ethanol and 12 grams (0.52 mol) of sodium metal were dispersed in 100 milliliters of toluene and the dispersion heated to a boiling temperature under reflux to form the alcoholate. 66.7 grams (0.6 mol) of 2-chloro-allyl chloride was then added to the mixture and heating was continued at temperatures increasing from 107° to 114° C. and under reflux for 4 hours. Fractional distillation of the crude reaction mixture yielded 75 grams of (beta-2-toloxy-ethyl) (2-chloro-allyl) ether, a product boiling at 128°-134° C. at 3 millimeters pressure and having a specific gravity of 1.108 at 25°/25° C.

In a similar manner alkali metal salts of other aromatic-oxy-alkylols may be reacted with 2-chloro-allyl chloride, 2-bromo-allyl chloride, 3-chloro-methallyl chloride, monochloro-butenyl chloride, and the like to obtain such compounds as (beta - 2 - chloro - 4 - tertiary-butyl-phenoxy-ethyl) (2-chloro-allyl) ether, (beta-4-chloro-phenoxy-ethyl) (2-bromo-allyl) ether, (beta-2-xenoxy-ethyl) (3-chloro-methallyl) ether, (beta-toloxy-ethyl) (monochloro-butenyl) ether, (gamma - 2 - cyclohexyl-phenoxy-propyl) (2-chloro-allyl) ether, (beta-4-xenoxy-butyl) (2-chloro-allyl) ether, beta-(2.4.6-trichloro-phenoxy-ethyl) (2-bromo-allyl) ether, etc. By reacting alkali metal salts of such compounds as beta - (4 - tertiary - butyl - phenoxy) - beta' - hydroxy-diethyl ether, beta-(2-phenoxy-ethoxy) - beta'-hydroxy-diethyl ether, and beta-(2-phenoxy-ethoxy) - beta' - (2-hydroxy-ethoxy) -diethyl ether with the monochloro- or monobromo-alkenyl halides, such compounds as beta-(4-tertiary-butyl - phenoxy) - beta' - (2 - chloro - allyloxy) - diethyl ether, beta-(2-phenoxy-ethoxy)-beta'-3-chloro-2-methylallyloxy)-diethyl ether, and beta-(2-phenoxy-ethoxy) - beta' - (2-bromo-allyloxy-ethoxy)-diethyl ether may be obtained.

Similarly the (aryloxy-propyl) (monochloro-pentenyl) ethers, (aryloxy-ethyl) (monochloro-hexenyl) ethers, (aryloxy-hexyl) (2-chloro-butenyl) ethers, beta-aryloxy-beta'-(2-chloro-allyl)-dipropyl ethers, gamma-aryloxy-gamma'-(2-chloro-allyloxy)-dipropyl ethers, beta-aryloxy - beta' - (2-bromo - allyloxy) - ethyl - propyl ethers, beta-(aryloxy-propoxy)-beta'-(2-bromo-butenyl-oxy)-diethyl ethers, beta-(aryloxy-ethoxy) - beta' - (2 - bromo - butenyloxy - ethoxy)-diethyl ethers, and the like may be prepared substantially as set forth above.

Representative of the numerous phenols from which the foregoing derivatives may be prepared are 2.4-dimethyl phenol, 2-methyl-5-isopropyl phenol, 4-benzyl phenol, 2-methoxy phenol, 2.4-dinitro-6-methyl phenol, 4-octadecanyl phenol, 4-allyl phenol, 2-methoxy-4-allyl phenol, 2-chloro-4-phenyl phenol, 2.4.6-tribromo phenol, pentachloro phenol, 4-iodo phenol, alpha-naphthol, 4-chloro-alpha-naphthol, and tetrahydronaphthol.

We claim:

1. A compound having the formula

R-O-(C₂H₂z-O)m-CnH2n-2-Y wherein R represents an aromatic radical, Y is a member of the group consisting of chlorine and bromine, m is an integer not greater than 4, n is an integer from 3 to 6, inclusive, z is an integer from 2 to 6, inclusive, and in which the halogen of the halo-alkenyl radical is attached to an unsaturated carbon atom.

2. A compound having the formula

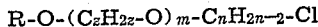
R-O-(C₂H2z-O)m-CnH2n-2-Cl wherein R represents an aromatic radical, m is an integer not greater than 4, n is an integer from 3 to 6, inclusive, z is an integer from 3 to 6, inclusive, and in which the chlorine of the chloro-alkenyl radical is attached to an unsaturated carbon atom.

3. A compound having the formula

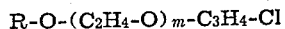
R-O-(C₂H₄-O)m-C₃H₄-Cl wherein R represents an aromatic radical, m is an integer not greater than 4, and in which the chlorine of the chloro-propenyl radical is attached to an unsaturated carbon atom.

4. A compound having the formula

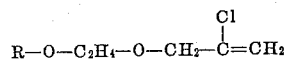
$$R-O-C_2H_4-O-CH_2-\underset{\underset{Cl}{|}}{C}=CH_2$$

wherein R represents an aromatic radical.

5. (Beta-2-toloxy-ethyl) (2-chloro-allyl) ether.

6. (Beta - 2 - xenoxy-ethyl) (2 - chloro-allyl) ether.

7. (Beta-4-chlorophenoxy-ethyl) (2-chloroallyl) ether.

CLARENCE L. MOYLE.
GERALD H. COLEMAN.